United States Patent
Voice et al.

(10) Patent No.: US 10,695,927 B2
(45) Date of Patent: Jun. 30, 2020

(54) SCRAPING TOOLS THAT DEBURR MULTIPLE EDGES OF A PART

(71) Applicant: The Boeing Company, Chicago, IL (US)

(72) Inventors: Aaron R. Voice, Lynnwood, WA (US); Jerome J. Demoulin, Everett, WA (US); Cody Rutten, Marysville, WA (US)

(73) Assignee: The Boeing Company, Chicago, IL (US)

( * ) Notice: Subject to any disclaimer, the term of this patent is extended or adjusted under 35 U.S.C. 154(b) by 195 days.

(21) Appl. No.: 15/446,144

(22) Filed: Mar. 1, 2017

(65) Prior Publication Data

US 2018/0250843 A1 Sep. 6, 2018

(51) Int. Cl.
| | |
|---|---|
| B26D 3/00 | (2006.01) |
| B26B 27/00 | (2006.01) |
| B26B 29/00 | (2006.01) |
| B26D 3/02 | (2006.01) |
| B29C 37/02 | (2006.01) |

(52) U.S. Cl.
CPC .............. *B26D 3/008* (2013.01); *B26B 27/00* (2013.01); *B26B 29/00* (2013.01); *B26D 3/02* (2013.01); *B29C 37/02* (2013.01)

(58) Field of Classification Search
CPC .......... B29C 37/02; B23D 9/00; B23D 79/08; B26D 3/02; B26D 3/065; B26D 5/005; B26D 3/008; B44D 3/162; B44D 3/164; B27G 17/025; A47L 13/08

USPC ....... 30/170, 172, 173, 280, 281; 15/236.06, 15/236.01, 236.05, 236.09; D32/46, 48; 29/81.11, 81.17; 407/15
See application file for complete search history.

(56) References Cited

U.S. PATENT DOCUMENTS

| | | | | |
|---|---|---|---|---|
| 568,160 | A * | 9/1896 | Brock ...................... | B27D 1/00 156/579 |
| 2,390,722 | A * | 12/1945 | Markstrum ............ | B23D 43/02 407/15 |

(Continued)

FOREIGN PATENT DOCUMENTS

| | | | | |
|---|---|---|---|---|
| GB | 2182550 | A * | 5/1987 | ............. A47L 25/00 |
| JP | 2004344982 | A * | 12/2004 | ............. B29C 37/02 |

OTHER PUBLICATIONS

European Search Report; Application 17209995.4-1019/3372363; dated Aug. 16, 2018.
Snap-on Incorporated Catalog; 2017; Multipurpose Scraper.

*Primary Examiner* — Jason Daniel Prone
*Assistant Examiner* — Samuel A Davies
(74) *Attorney, Agent, or Firm* — Duft & Bornsen, PC (57) ABSTRACT

Systems and methods are provided for scraping tools for edging composite parts. One embodiment is an apparatus that includes a scraping tool. The scraping tool includes a base member, a first wall upwardly extending from a first side of the base member, a second wall upwardly extending from a second side of the base member, and a channel defined by the base member, the first wall, and the second wall. The scraping tool further includes a first blade mount within the channel that is fixed to the first wall, and a second blade mount within the channel that is fixed to the second wall. The first blade mount secures a blade oriented oblique to the base member, and the second blade mount secures a blade oriented oblique to the base member.

20 Claims, 10 Drawing Sheets

(56) References Cited

U.S. PATENT DOCUMENTS

| | | | | |
|---|---|---|---|---|
| 2,545,379 A * | 3/1951 | Pomichter | B44D 3/16 | 30/172 |
| 2,590,966 A * | 4/1952 | Heller | B23D 79/00 | 30/172 |
| 3,460,220 A * | 8/1969 | Connelly | B23D 1/26 | 407/108 |
| 3,596,356 A * | 8/1971 | O'Neal | B26D 3/065 | 30/279.6 |
| 3,732,619 A * | 5/1973 | Grueber | B27D 5/006 | 30/287 |
| 3,822,160 A * | 7/1974 | La Barge et al. | B29C 37/02 | 156/212 |
| 3,895,439 A * | 7/1975 | Ehrenberg | B23B 51/101 | 30/171 |
| 3,990,147 A * | 11/1976 | Gill | B27G 17/04 | 30/172 |
| 4,495,697 A | 1/1985 | Ruff | | |
| 5,048,188 A | 9/1991 | Wolff | | |
| 5,054,201 A * | 10/1991 | Andrews | B23B 27/1662 | 15/236.08 |
| 5,359,776 A * | 11/1994 | Glazar | B26B 27/00 | 30/169 |
| 6,023,846 A * | 2/2000 | Crawford | B26B 3/08 | 15/236.01 |
| 6,076,998 A * | 6/2000 | Okuya | B23D 79/08 | 30/314 |
| 6,151,779 A * | 11/2000 | Brown | B26B 27/00 | 30/1.5 |
| D477,522 S * | 7/2003 | James | D8/101 | |
| 2001/0034919 A1* | 11/2001 | Faggiotto | B60S 1/38 | 15/236.06 |
| 2007/0266828 A1* | 11/2007 | Byers | B24D 15/065 | 76/82 |
| 2008/0193235 A1* | 8/2008 | Ames | B23B 5/167 | 408/211 |
| 2013/0263709 A1* | 10/2013 | Beakler | B27G 17/04 | 83/13 |
| 2014/0305270 A1* | 10/2014 | Withey | F01D 5/005 | 83/56 |
| 2015/0151374 A1* | 6/2015 | Lee | B23D 79/021 | 30/170 |
| 2015/0208870 A1 | 7/2015 | Bagley | | |

* cited by examiner

SCRAPING TOOLS THAT DEBURR MULTIPLE EDGES OF A PART

FIELD

The disclosure relates to the field of manufacturing, and in particular, to tools for shaping composite parts.

BACKGROUND

Composite parts, such as Carbon Fiber Reinforced Polymer (CFRP) panels for aircraft, may benefit from edging after they are first formed. For example, resin at a CFRP panel may accumulate at edges of the panel before the panel is cured, and then become fixed to the panel during curing. This results in inconsistencies (e.g., burrs, bulges, etc.) at the edges of the panel, which complicate the process of assembling multiple panels together. Hence, it may be desirable to scrape edges of a CFRP panel to ensure that boundaries of the panel are smooth and even.

Utilizing a straight razor to scrape a panel helps to alleviate these issues with the edges of composite parts. However, the amount of material removed from an edge varies as a function of force applied to the razor, and this amount of force may vary along the length of a user's stroke of the razor across the edge. Furthermore, multiple passes of a razor are often required in order to form an even edge, and it remains a trying task to ensure that a razor meets with the edge at a desired angle along the entire length of a user's stroke.

For at least these reasons, fabricators of composite parts continue to seek out enhanced tools that ease the burden of deburring newly created composite parts.

SUMMARY

Embodiments described herein provide for enhanced multi-edge scraping tools that include blades for removing inconsistencies from multiple edges of a composite part at once. This reduces the number of times a scraping tool is drawn across the edges of a composite part during edging. In further embodiments, these enhanced scraping tools may further include guides that ensure proper alignment of each blade with a corresponding edge of the part.

One embodiment is an apparatus that includes a scraping tool. The scraping tool includes a base member, a first wall upwardly extending from a first side of the base member, a second wall upwardly extending from a second side of the base member, and a channel defined by the base member, the first wall, and the second wall. The scraping tool further includes a first blade mount within the channel that is fixed to the first wall, and a second blade mount within the channel that is fixed to the second wall. The first blade mount secures a blade oriented oblique to the base member, and the second blade mount secures a blade oriented oblique to the base member.

A further embodiment is an apparatus that includes a frame defining a C-shaped channel comprising two walls and a base member. The apparatus further includes blades within the C-shaped channel that are secured along and obliquely oriented to the walls of the C-shaped channel. Blades secured to a same wall have a same orientation, each blade is obliquely oriented with respect to a corresponding wall, and each blade slopes downwards from a corresponding wall towards the base member.

A still further embodiment is an apparatus that includes a frame, a first set of blades mounted to the frame that are arranged in series along a length of a first side of the frame, and a second set of blades mounted to the frame that are arranged in series along the length of a second side of the frame. The second side of the frame faces the first side of the frame. Furthermore, blades in the first set of blades have the same orientation, and blades in the second set of blades have an orientation that is mirrored with respect to the first set of blades.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
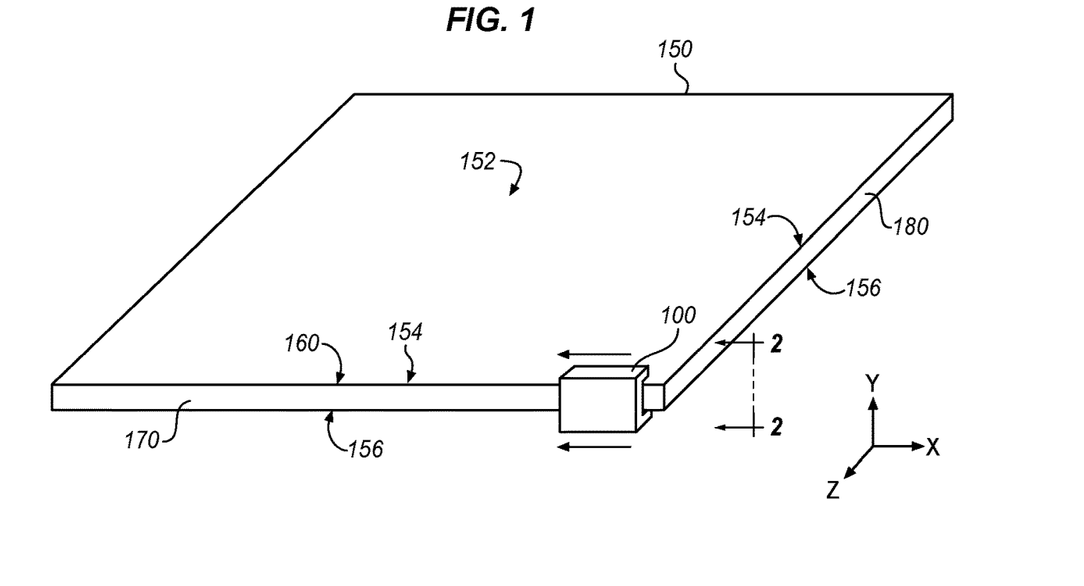
FIG. 1 is a diagram of a scraping tool being drawn across multiple edges of a composite part in an exemplary embodiment.

FIG. 1 is a diagram of a scraping tool 100 being drawn across edge 154 and edge 156 of part 150 in an exemplary embodiment. In one embodiment, part 150 is a composite part that comprises multiple layers of CFRP. Each layer includes parallel carbon fibers and cured resin, and different layers may exhibit different fiber orientations in order to provide desired levels of strength in different directions. In further embodiments, part 150 may comprise any suitable component amenable to edge scraping via a hand tool. As shown in FIG. 1, part 150 includes face 152, as well as side 170 and side 180. Each side includes an upper edge 154 and a lower edge 156, which form the exterior corners of part 150 (e.g., a corner at which side 170 and face 152 meet). Scraping tool 100 is drawn across both edges of side 170 in the direction indicated by the arrows on FIG. 1, in order to scrape the edges into a desired profile.

As used herein, "drawing" of scraping tool 100 does not involve directly pushing scraping tool 100 deeply into/ against part 150, but rather involves sweeping scraping tool 100 across edges 154 and 156. Thus, when deburring/ drawing/sweeping, material is not cut off of part 150 as would be done by pushing a sharp blade into part 150. Rather, material is scraped off due to pulling/drawing. For example, the action of scraping tool 100 may remove inconsistencies such as bump 160. This operation may beneficially round the edges (154, 156) of side 170, resulting in a fillet uniting face 152 to side 170.

Figure 2:
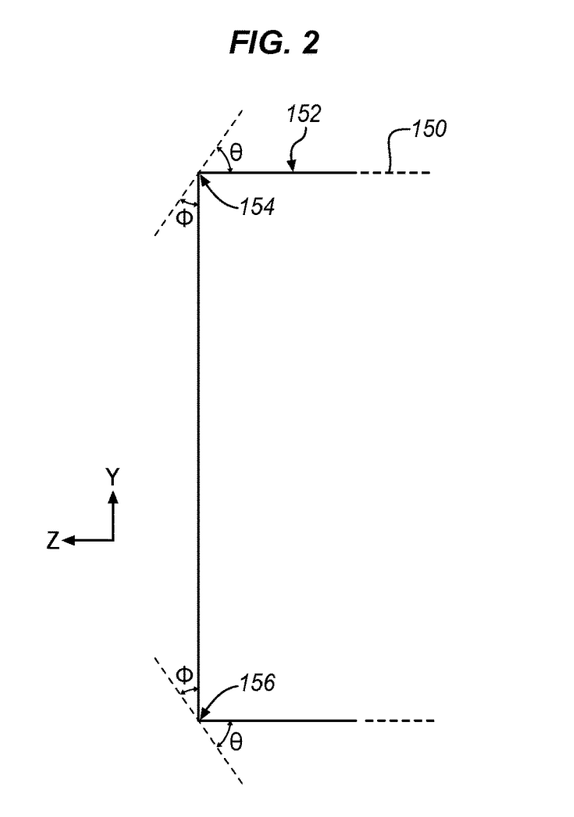
FIG. 2 is a diagram illustrating desired angles of contact with an edge of a composite part in an exemplary embodiment.

FIG. 2 is a side view of part 150 illustrating details of the edging process in an exemplary embodiment. Specifically, FIG. 2 corresponds with view arrows 2 of FIG. 1. In this embodiment, in order to remove inconsistencies from edge 154 and edge 156, it is desirable for scraping tool 100 to meet each edge at a desired angle. FIG. 2 illustrates desired angles θ (e.g., 45°) and angle Φ (e.g., also 45°) for contacting edge 154 and edge 156. In this embodiment, θ and Φ correspond with the scraping action of a straight blade. That is, θ, Φ, and the internal angle of edge 154 combine to form 180°. However, in further embodiments θ and Φ may correspond with a bent or kinked blade desired in order to alter the profile of edge 154 and/or edge 156 as desired. In still further embodiments, θ and Φ may vary between edge 154 and edge 156.

Figure 3:
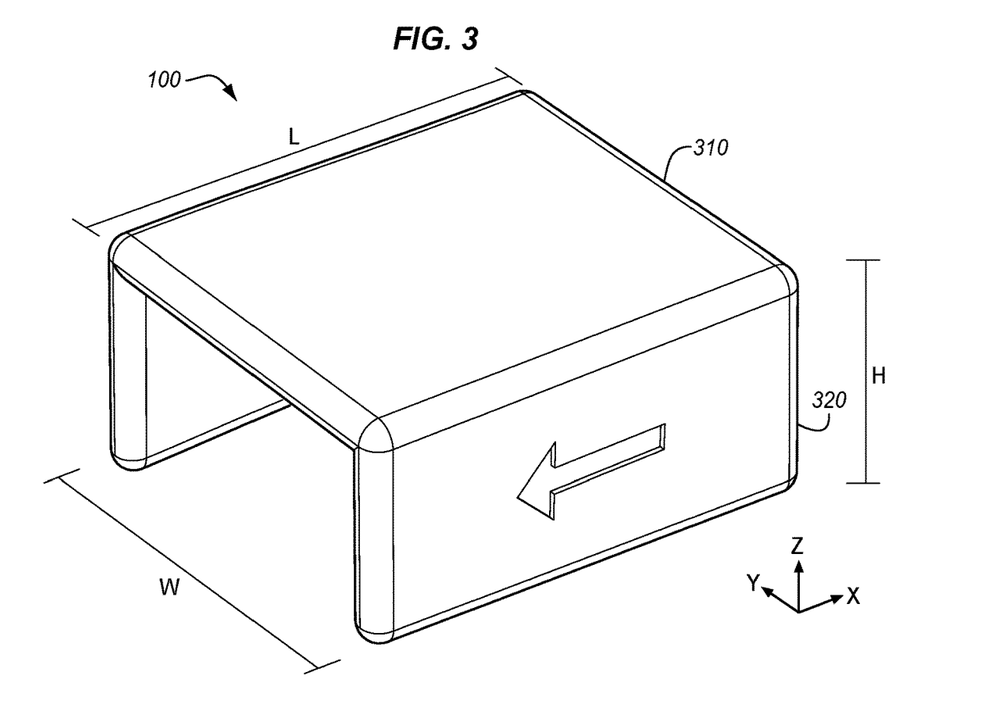
FIGS. 3-5 are diagrams illustrating a scraping tool in an exemplary embodiment.
Figure 4:
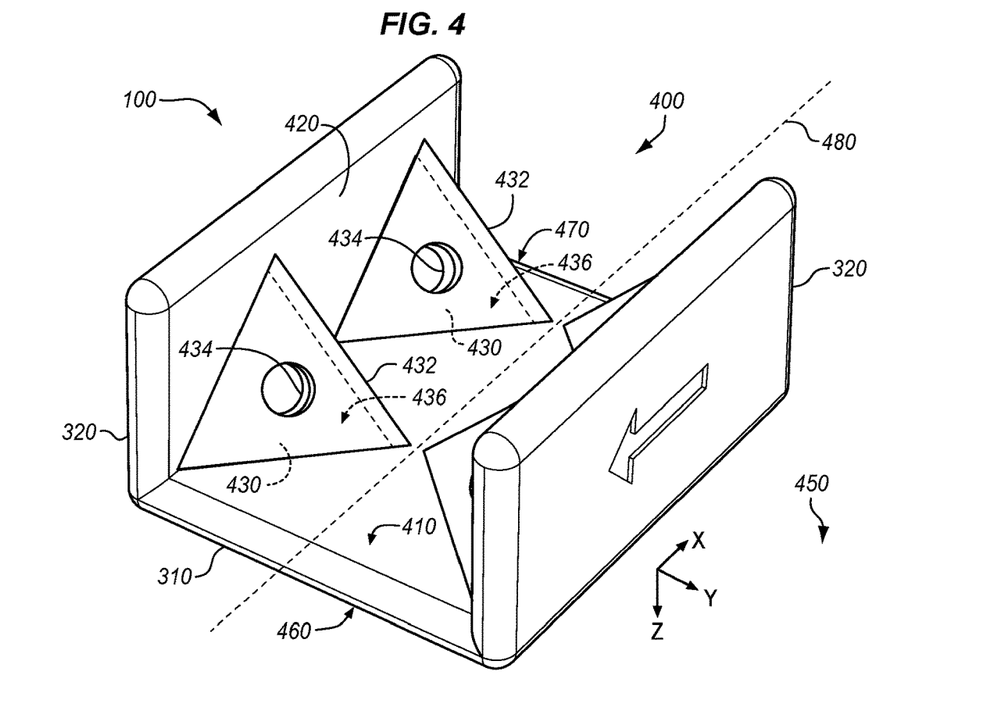
Figure 5:
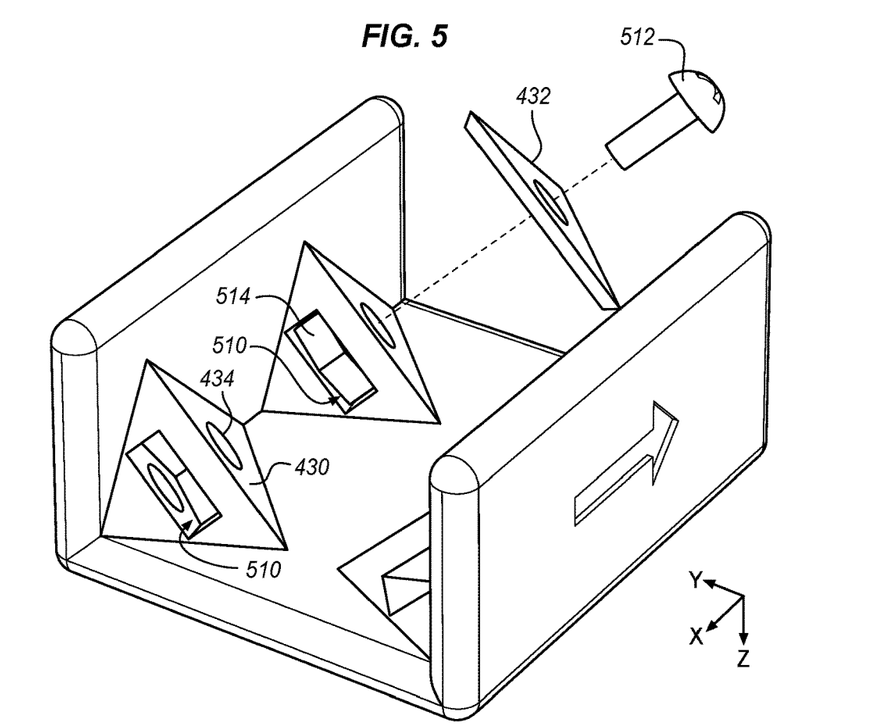

FIGS. 3-5 illustrate details of scraping tool 100. FIG. 3 is a perspective view which illustrates that scraping tool 100 includes base member 310 (referred to herein as "base 310"). Walls 320 extend from sides of base 310, and are perpendicular to base 310 in this embodiment. Base 310 and walls 320 form a frame (e.g., defining a C-shaped channel) for scraping tool 100. The length (L), width (W), and height (H) of scraping tool 100 are also illustrated. In this embodiment, scraping tool 100 is symmetrical about an XZ plane extending through the center of scraping tool 100.

FIG. 4 provides a perspective view of the interior volume 400 of scraping tool 100 (e.g., as contrasted with an exterior volume 450 surrounding scraping tool 100). In this view, an inward-facing side 420 of a wall 320 is shown, as well as an inward-facing side 410 of base 310. Front end 460 and back end 470 of scraping tool 100 are also illustrated, as is central axis 480.

Sets of blade mounts 430 are attached to side 410 and side 420. Specifically, blade mounts 430 proximate to the left wall 320 of FIG. 4 hold a first set of blades 432 for deburring edge 156, and blade mounts 430 proximate to the right wall 320 of FIG. 4 hold a second set of blades 432 for deburring edge 154. Blades 432 that are in the same set are arranged in series, and will scrape the same edge of part 150 in series when scraping tool 100 is drawn across a side of part 150. Blades 432 in the same set may all be oriented in the same direction with respect to base 310, and blades 432 in different sets may be mirrored with respect to each other. Blades 432 that are secured to different walls extend for less than half of a width of the C-shaped channel.

Blade mounts 430 are oriented such that blades 432 slope downward from a wall 320 towards base 310, and further such that blades 432 slope upward from front to back. In this manner, the edge of each blade 432 faces towards the back end 470 of scraping tool 100. In other words, a face 436 of each blade mount 432 slopes downwards as the blade mount 432 extends in a direction of travel (as indicated by the arrows), and the face 436 of each blade mount 432 widens as the face slopes downward.

In this embodiment, each blade mount 430 includes an orifice 434 for mounting a blade 432 in place. In this manner, each of the blades 432 is removably attached to a corresponding blade mount 430. Because scraping tool 100 includes multiple blades 432 in series, drawing scraping tool 100 in a single pass across part 150 results in multiple edging operations by scraping tool 100. That is, one edging operation is performed on an edge for each blade 432. While blade mounts 430 are illustrated in series in this embodiment, in further embodiments scraping tool 100 may include a different number of blades 430 per wall 320.

Figure 6:
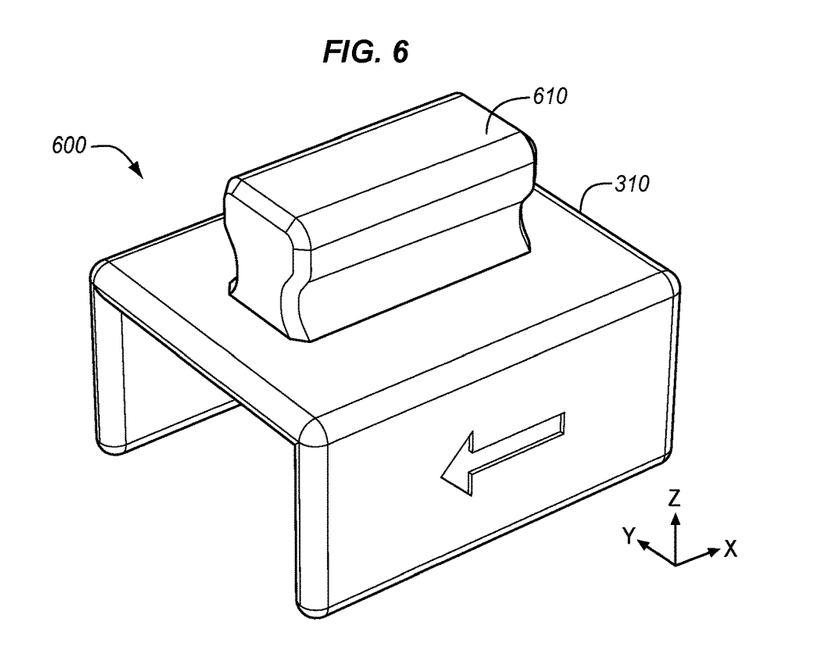
FIG. 6 is a diagram of a scraping tool that includes a handle in an exemplary embodiment.

FIG. 5 illustrates a further perspective view of scraping tool 100. This view illustrates that orifices 434 lead to cavities 510, which may each in combination with a bolt 512 and a nut 514 secure a blade 432 in place oblique to base 310. Scraping tool 100 may further be modified as desired in order to enhance its ergonomic properties and/or efficacy. For example, FIG. 6 illustrates a scraping tool 600 which has been enhanced with a handle 610 protruding from base 310. This may enhance ease of use by a technician, thereby reducing the amount of user fatigue involved in operating scraping tool 600.

Figure 7:
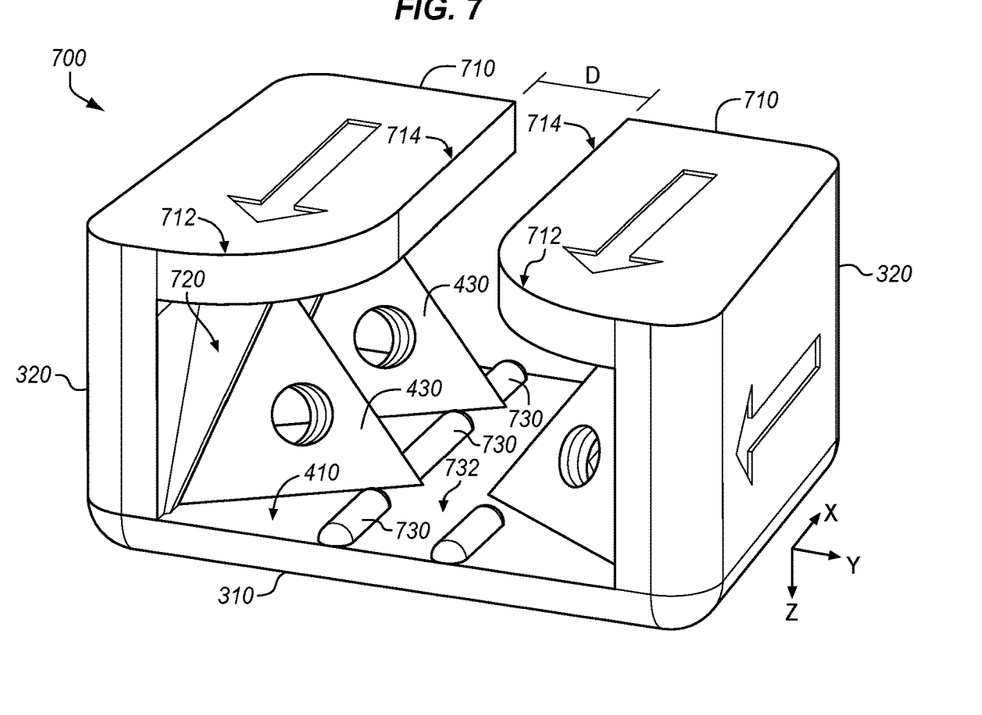
FIGS. 7-8 are views of a further scraping tool that includes guides in an exemplary embodiment.
Figure 8:
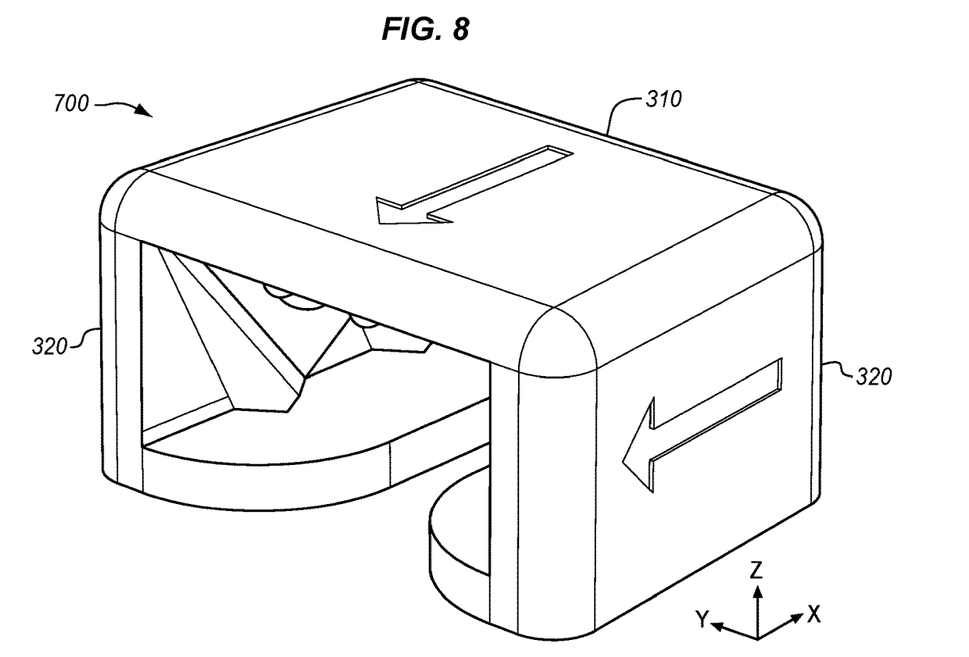
Figure 9:
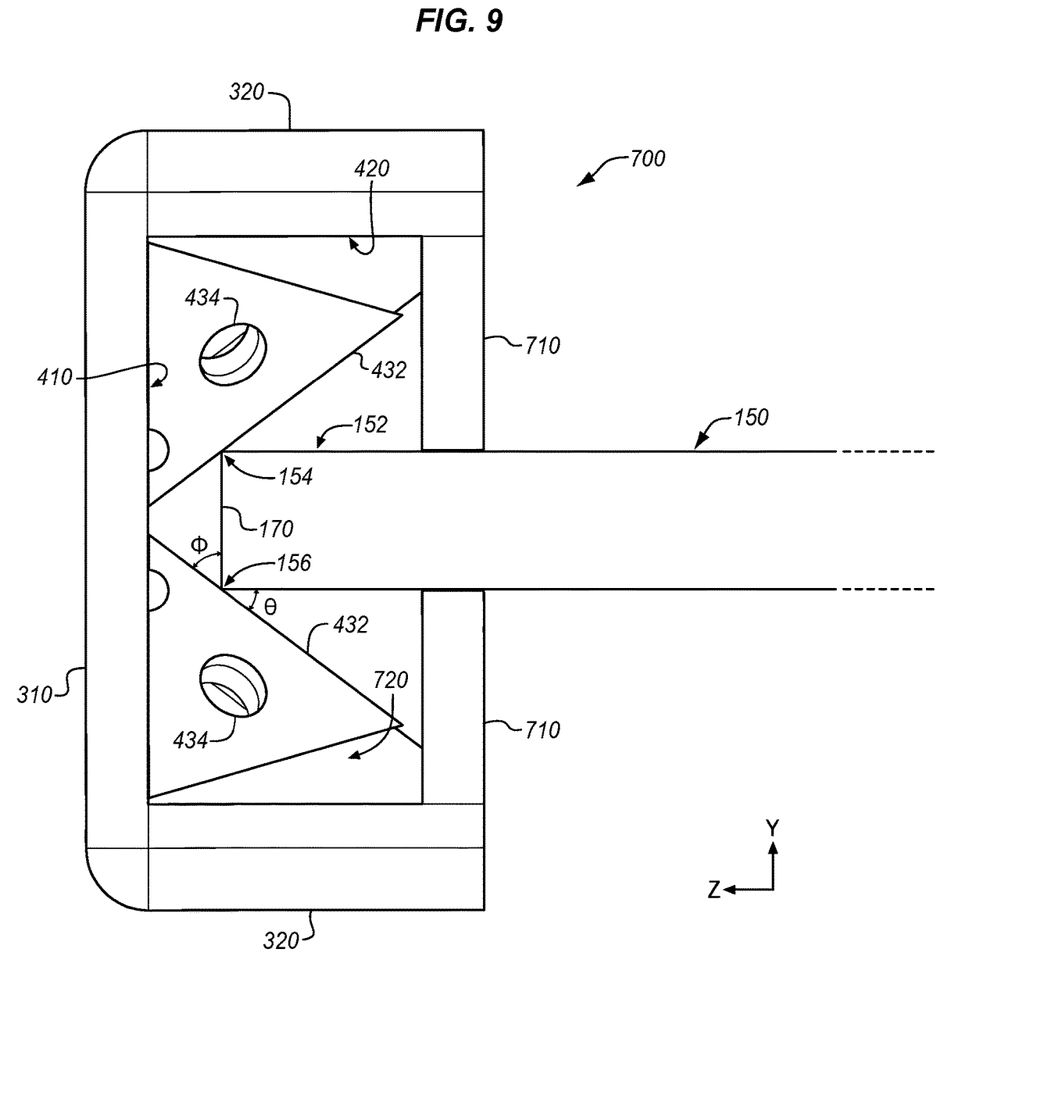
FIG. 9 is a diagram illustrating a scraping tool aligned with multiple edges of a part in an exemplary embodiment.

FIGS. 7-9 illustrate a further embodiment where a scraping tool 700 includes guides that facilitate alignment of the scraping tool 700 with a composite part. The guides further ensure that scraping tool 700 remains aligned as it is drawn across edges of a composite part. Specifically, FIG. 7 illustrates a scraping tool 700 having features including guides 710, insets 720, and deflectors 730. Guides 710 extend laterally from walls 320, and include curved forward edges 712, which facilitate the drawing of scraping tool 700 across part 150 without guides 710 catching on part 150. Inner edges 714 of guides 710 are separated by a gap of distance D, which corresponds with a thickness of part 150. Hence, guides 710 hold part 150 in place at scraping tool 700, ensuring that the alignment of scraping tool 700 does not change (e.g., due to user error) as scraping tool 700 is drawn across part 150. In this embodiment, guides 710 are flat, base 310 is flat, and guides 710 are parallel with base 310.

In this embodiment, insets 720 are fixedly attached to walls 320, and each blade mount 430 is attached to scraping tool 700 via a corresponding inset 720. Each blade 432 includes a leading edge and a trailing edge; and each inset 720 is shaped to prevent a blade 432 from being mounted with the leading edge and trailing edge reversed.

Deflectors 730 protrude from inner side 410 of base 310 and divert debris from blades 432 into debris channel 732. In this embodiment, blade mounts 430 protrude through deflectors 730 (i.e., along Y), interrupting deflectors 730 as the deflectors continue along a length of the base (i.e., along X). Each deflector 730 forms a convex arc extending from inner side 410 of base 310, and each deflector 730 is semi hemispherical at a forward portion proximate to a front end of scraping tool 700.

FIG. 8 illustrates a further view of scraping tool 700, while FIG. 9 illustrates scraping tool 700 aligned at part 150. As shown in FIG. 9, side 170 of part 150 is nestled between guides 710, ensuring that part 150 is held in a desired orientation. Blades 432 contact edges 154 and 156. Material removed from edges 154 and 156 forms debris, which may fall out of scraping tool 700. Furthermore, blades 432 are aligned to correspond with a desired θ and Φ for scraping part 150, and may be obliquely oriented with regard to base 310 and/or wall 320.

Figure 10:
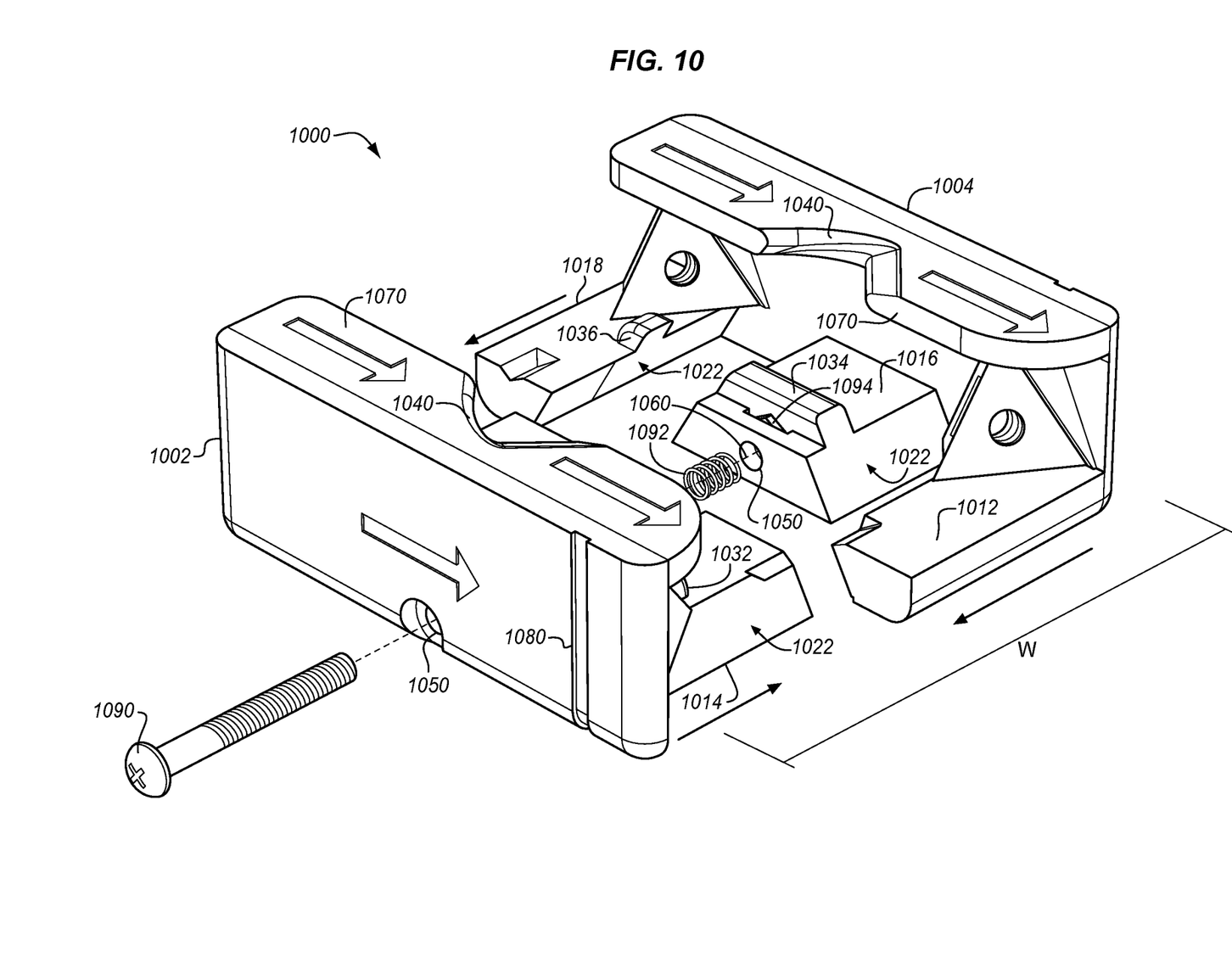
FIGS. 10-11 are views of a further scraping tool in an exemplary embodiment.
Figure 11:
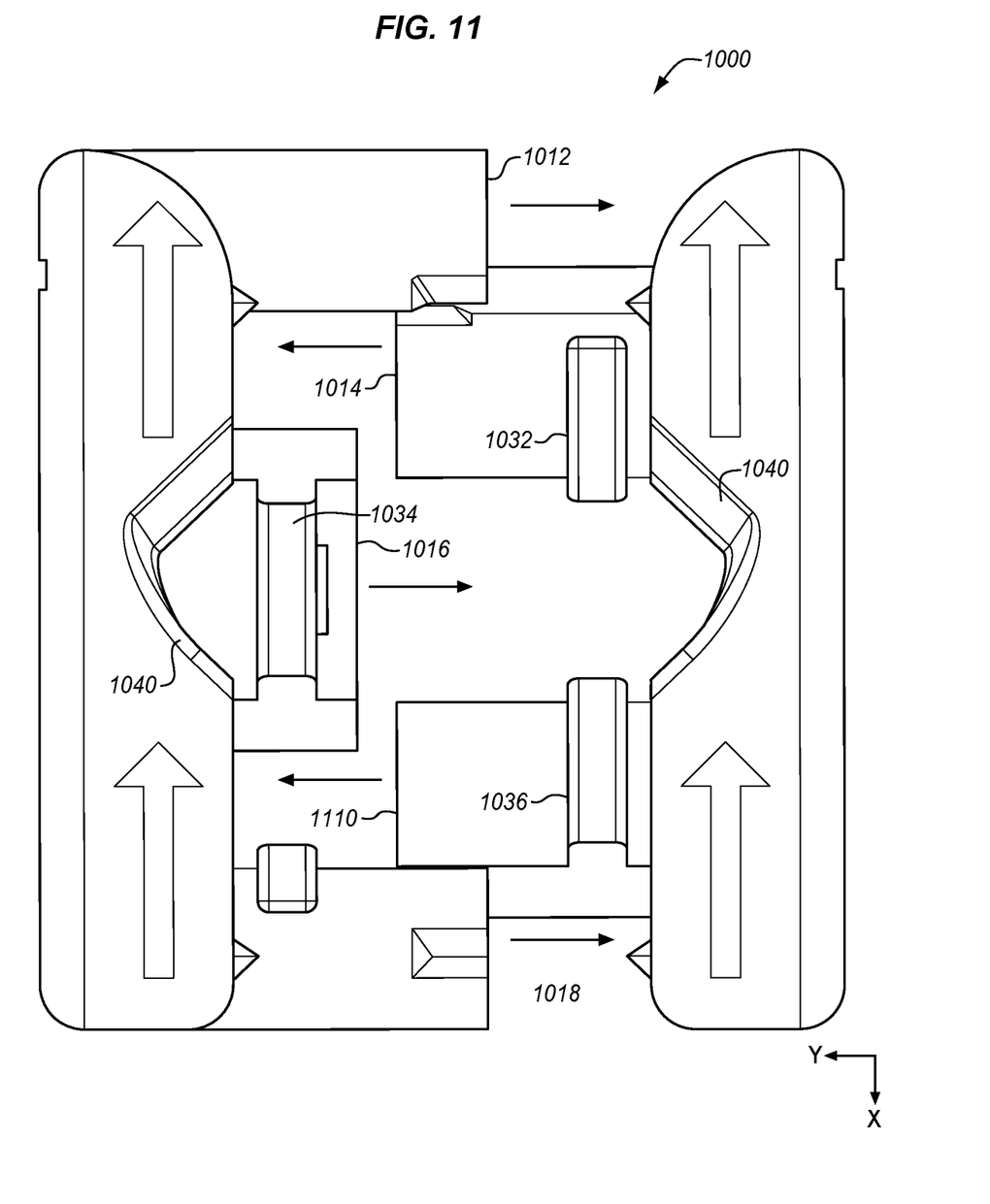

FIGS. 10-11 are views of a further scraping tool 1000 comprising two pieces (piece 1002 and piece 1004) in an exemplary embodiment. In this manner, scraping tool 1000 is adjustable to fit any of a variety of sizes of parts. To achieve the desired level of adjustability, scraping tool 1000 includes holes 1050, through which a bolt 1090 or another fastener (not shown) may be threaded in order to secure scraping tool 1000 together and define a distance between guides 1070. Thus, holes 1050 in combination with bolt 1090 together operate as an adjustable brace for scraping tool 1000. The adjustable brace structurally unites piece 1002 and piece 1004, enabling control of a size of scraping tool 1000. That is, using holes 1050 in combination with bolt 1090, the width W of scraping tool 1000 may be adjusted to fit guides 1070 to different parts 150. In further embodiments, a graduated ruler may be placed between guides 1070, such that the distance between guides 1070 may be easily measured when tool 1000 is adjusted. A spring 1092 may be added to perform the role of applying tension to one or more nuts 1094 which secure bolt 1090 in order to prevent bolt 1090 from spinning freely. Furthermore, Depending on how long a linear spring bushing is, a user may perform fine adjustment the distance between piece 1002 and piece 1004 in order to tune the amount of scraping performed by scraping tool 1000.

FIG. 10 further illustrates groove 1080, which enables a user of scraping tool 1000 to determine via tactile methods whether scraping tool 1000 is facing forward. Furthermore, in this embodiment the base of scraping tool 1000 has been subdivided into segments, including segment 1012, segment 1014, segment 1016, and segment 1018. Each segment includes an angled face 1022, and the angled faces of different segments interlock in order to provide mechanical integrity and prevent rotation of piece 1002 and piece 1004 independently of each other. In a further embodiment, flanges and corresponding grooves may extend laterally at angled faces 1022 in order to further facilitate interlock between segments.

Also visible at scraping tool 1000 is a tripartite rail comprising element 1032, element 1034, and element 1036. These elements protrude above their corresponding segments in order to ensure that part 150 cannot be forced too deep (i.e., more than a predetermined depth) into scraping tool 1000, and therefore prevent the removal of more material than desired during the deburring/edging process. Scraping tool 1000 further includes notches 1040 at guides 1070. Notches 1040 provide a gap through which a screwdriver or other tool may enter scraping tool 1000 in order to install and/or rotate blades as desired. FIG. 11 further illustrates scraping tool 1000 from a top view. In this view, an additional segment 1110 may be viewed.

In further embodiments, certain portions of scraping tool 1000 may be colored in order to enhance clarity. For example, the interior volume of scraping tool 1000 may be brightly colored (e.g., with a glow-in-the dark dye) in order to ensure adequate illumination of an interior of scraping tool 1000. Meanwhile, the tripartite rail and segments 1012-1018 (as well as segment 1110) may be darkly colored in order to ensure a notable color contrast with debris accumulating in those areas.

Figure 12:
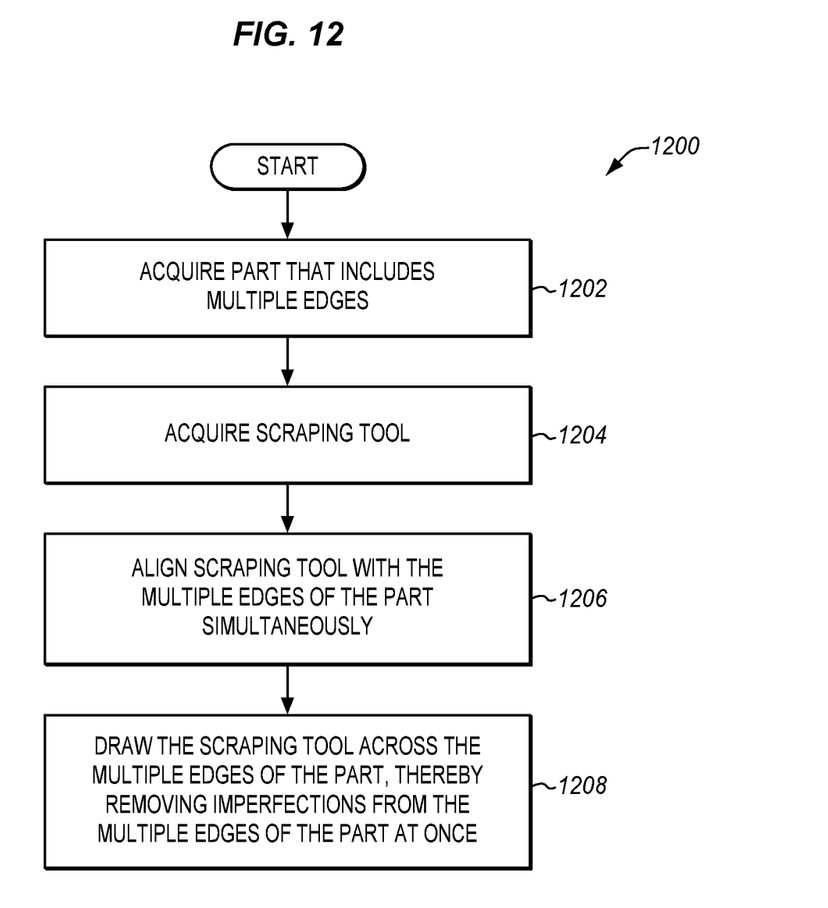
FIG. 12 is a flowchart illustrating a method for operating a scraping tool in an exemplary embodiment.

Illustrative details of the operation of scraping tools will be discussed with regard to FIG. 12. Assume, for this embodiment, that a technician in a fabrication environment desires to scrape the edges of incoming composite parts in order to ensure that the composite parts have even edges without inconsistencies. FIG. 12 is a flowchart illustrating a method 1200 for operating a scraping tool in an exemplary embodiment. The steps of method 1200 are described with reference to scraping tool 1000 of FIGS. 10-11, but those skilled in the art will appreciate that method 1200 may be performed with other scraping tools as desired. The steps of the flowcharts described herein are not all inclusive and may include other steps not shown. The steps described herein may also be performed in an alternative order.

According to method 1200, part 150 is acquired, which includes multiple edges 154 and 156 (step 1202). This operation may be performed, for example, by a robot arm or other device which includes scraping tool 1000 as an end effector. The robot arm may perform this operation in accordance with a Numerical Control (NC) program stored in memory at a controller. The acquiring of part 150 may include placing part 150 in a workspace wherein edging is to take place (e.g., at the edge of a table, such that at least one side of part 150 extends beyond the table).

Scraping tool 1000 is also acquired (step 1204). This may comprise mounting scraping tool 700 to a robot arm, selecting scraping tool 1000 from multiple available scraping tools for different composite parts, etc. Method 1200 further includes aligning scraping tool 1000 with multiple edges (i.e., edge 154, and edge 156) of part 150, simultaneously (step 1206). This may be performed by inserting side 170 of part 150 between guides 1070 of scraping tool 1000. With scraping tool 1000 aligned, scraping tool 1000 is drawn in a direction of travel (as indicated by arrows on scraping tool 1000) across multiple edges (i.e., edge 154, and edge 156) concurrently, which removes inconsistencies from the multiple edges at once (step 1208). That is, one set of blade mounts 430 deburrs edge 154 in series, while another set of blade mounts 430 deburrs edge 156 in series. These operations ensure that a single sweep of scraping tool 700 across side 170 provides a smooth shave of edges 154 and 156.

Method 1200 provides a substantial advantage over single-razor techniques for shaving the edges of a composite part, in that it reduces the number of sweeps needed across each edge by a scraping tool (thereby reducing fatigue) while also reducing chances of misalignment during edging (thereby reducing the amount skill required to perform edging).

EXAMPLES

In the following examples, additional processes, systems, and methods are described in the context of a scraping tool for edging a composite part.

Figure 13:
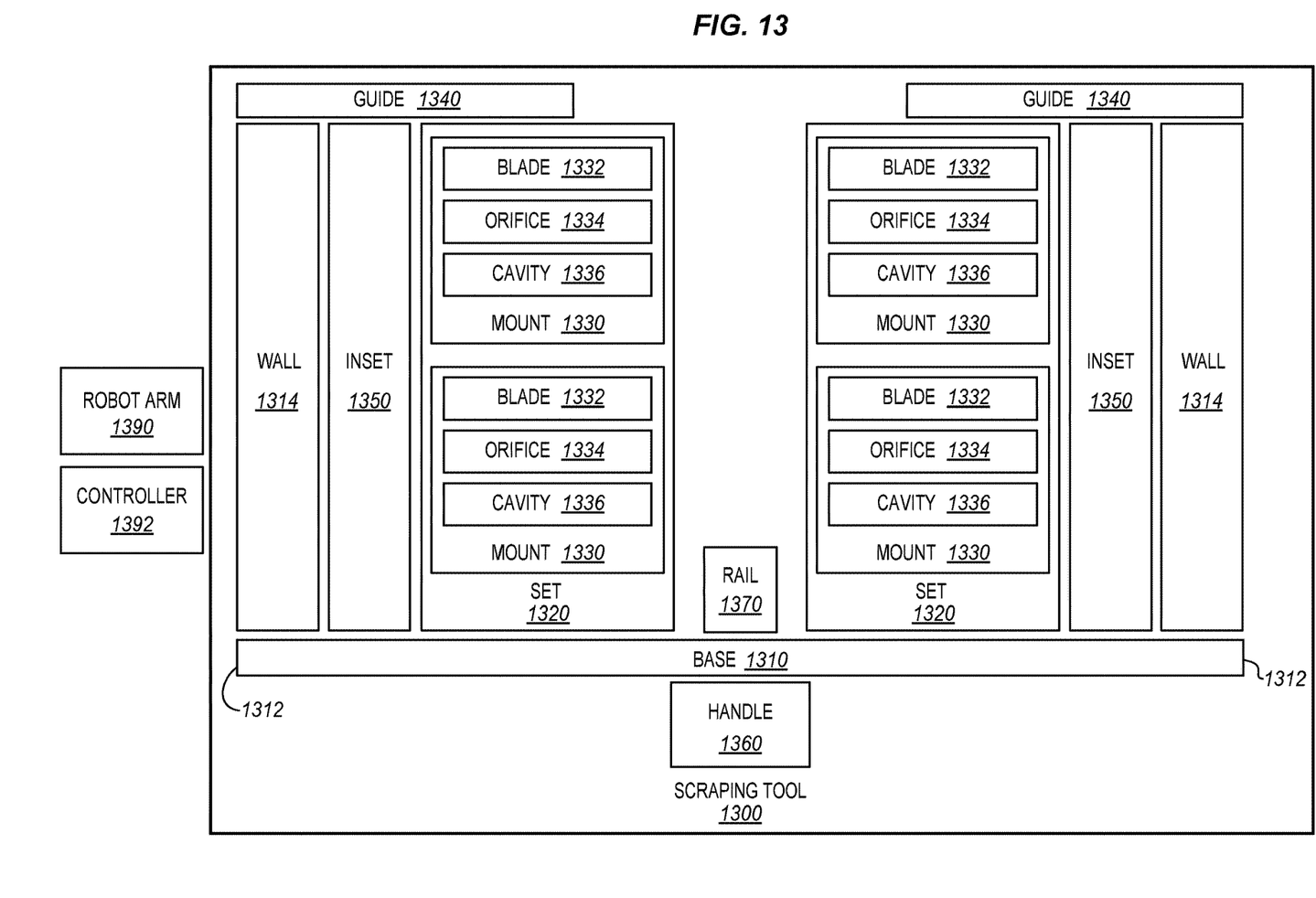
FIG. 13 is a block diagram of a scraping tool in an exemplary embodiment.

FIG. 13 is a block diagram of scraping tool 1300 in an exemplary embodiment. According to FIG. 13, scraping tool 1300 includes base 1310, from which handle 1360 protrudes. Walls 1314 extend upwardly from base 1310, and mounts 1330 extend from walls 1314. Sets 1320 of mounts 1330 are attached to insets 1350. Each set 1320 includes multiple mounts 1330, and each mount 1330 includes a blade 1332, an orifice 1334, and a cavity 1336. Guides 1340 are fixed to walls 1314, and ensure that a composite part entering scraping tool 1300 is properly oriented/aligned.

Rail 1370 ensures that the composite part does not enter beyond a predefined distance into scraping tool 1300. In this example, scraping tool 1300 forms an end effector of a robot arm 1390, which is directed via instructions in an NC program at controller 1392. Controller 1392 may be implemented, for example, as custom circuitry, as a hardware processor executing programmed instructions, or some combination thereof.

Figure 14:
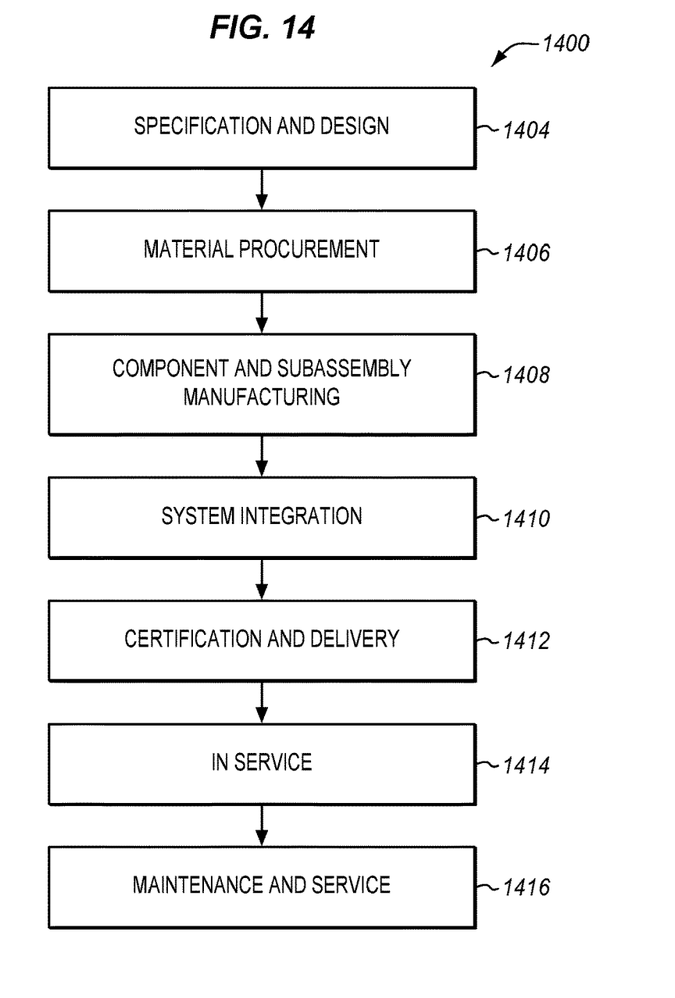
FIG. 14 is a flow diagram of aircraft production and service methodology in an exemplary embodiment.
Figure 15:
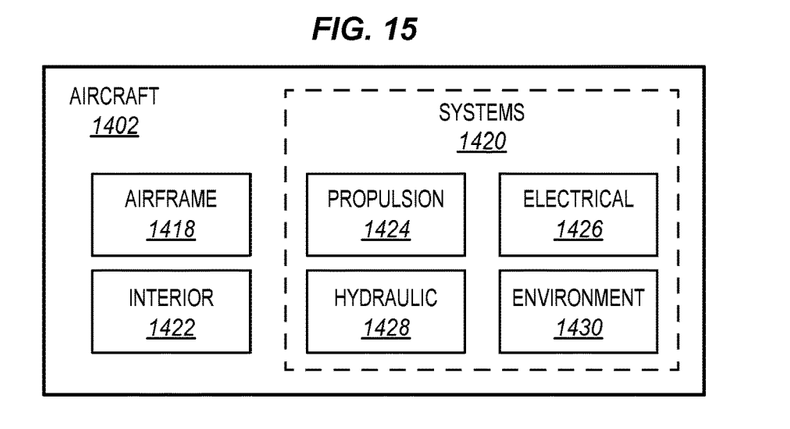
FIG. 15 is a block diagram of an aircraft in an exemplary embodiment.

Referring more particularly to the drawings, embodiments of the disclosure may be described in the context of an aircraft manufacturing and service method 1400 as shown in FIG. 14 and an aircraft 1402 as shown in FIG. 15. During pre-production, exemplary method 1400 may include specification and design 1404 of the aircraft 1402 and material procurement 1406. During production, component and subassembly manufacturing 1408 and system integration 1410 of the aircraft 1402 takes place. Thereafter, the aircraft 1402 may go through certification and delivery 1412 in order to be placed in service 1414. While in service by a customer, the aircraft 1402 is scheduled for routine maintenance and service 1416 (which may also include modification, reconfiguration, refurbishment, and so on). Apparatus and methods embodied herein may be employed during any one or more suitable stages of the production and service method 1400 (e.g., specification and design 1404, material procurement 1406, component and subassembly manufacturing 1408, system integration 1410, certification and delivery 1412, service 1414, maintenance and service 1416) and/or any suitable component of aircraft 1402 (e.g., airframe 1418, systems 1420, interior 1422, propulsion 1424, electrical 1426, hydraulic 1428, environmental 1430).

Each of the processes of method 1400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 1402 produced by exemplary method 1400 may include an airframe 1418 with a plurality of systems 1420 and an interior 1422. Examples of high-level systems 1420 include one or more of a propulsion system 1424, an electrical system 1426, a hydraulic system 1428, and an environmental system 1430. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1400. For example, components or subassemblies corresponding to production stage 1408 may be fabricated or manufactured in a manner similar to components or subassemblies produced while the aircraft 1402 is in service. Also, one or more apparatus embodiments, method embodiments, or a combination thereof may be utilized during the production stages 1408 and 1410, for example, by substantially expediting assembly of or reducing the cost of an aircraft 1402. Similarly, one or more of apparatus embodiments, method embodiments, or a combination thereof may be utilized while the aircraft 1402 is in service, for example and without limitation, to maintenance and service 1416. For example, the techniques and systems described herein may be used for steps 1406, 1408, 1410, 1414, and/or 1416, and/or may be used for airframe 1418 and/or interior 1422. These techniques and systems may even be utilized for systems 1420, including for example propulsion 1424, electrical 1426, hydraulic 1428, and/or environmental 1430.

In one embodiment, part 150 comprises a portion of airframe 1418, and is manufactured during component and subassembly manufacturing 1408. During manufacturing, part 150 is edged by scraping tool 1000. Part 150 may then be assembled into an aircraft in system integration 1410, and then be utilized in service 1414 until wear renders part 150 unusable. Then, in maintenance and service 1416, part 150 may be discarded and replaced with a newly manufactured part. Scraping tool 1000 may be utilized throughout component and subassembly manufacturing 1408 in order to complete the fabrication of additional parts 150.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. An apparatus comprising:
 a scraping tool comprising:
  a base member;
  a first wall upwardly extending from a first side of the base member;
  a second wall upwardly extending from a second side of the base member;
  a channel defined by the base member, an inner surface of the first wall, and an inner surface of the second wall;
  a first blade mount within the channel that abuts the inner surface of the first wall and is disposed wholly within the channel; and
  a second blade mount within the channel that abuts the inner surface of the second wall and is disposed wholly within the channel, wherein the first blade mount engages a stationary blade having a first cutting edge oriented oblique to the base member such that a line coincident with the first cutting edge intersects the first wall and the base member, and the second blade mount engages a stationary blade having a second cutting edge oriented oblique to the base member such that a line coincident with the second cutting edge intersects the second wall and the base member, and wherein each of the first blade mount and the second blade mount includes an orifice for receiving a fastener that removably secures the stationary blade in place, wherein the orifice defines a central axis oriented oblique to the base member, and to one of the first wall and the second wall.

2. The apparatus of claim 1 further comprising:
a first guide within the channel that projects laterally from the first wall towards the second wall; and
a second guide within the channel that projects laterally from the second wall towards the first wall,
wherein a gap between the first guide and the second guide is located above the first blade mount and the second blade mount.

3. The apparatus of claim 2 wherein:
each of the first guide and the second guide includes a curved forward edge.

4. The apparatus of claim 2 wherein:
the scraping tool further comprises:
a first piece that includes the first wall, the first blade mount, and a first segment of the base member;
a second piece that includes the second wall, the second blade mount, and a second segment of the base member; and
an adjustable brace that structurally unites the first piece and the second piece.

5. The apparatus of claim 1 wherein:
the scraping tool further comprises a rail that protrudes from the base member into the channel, extends from a front end to a back end of the base member, and is located between the blade mounts.

6. The apparatus of claim 1 wherein:
the scraping tool comprises:
multiple first blade mounts along the first wall;
multiple second blade mounts along the second wall; and
corresponding stationary blades secured to the blade mounts along the first wall and the second wall.

7. The apparatus of claim 6 wherein:
each of the blades is removably attached to a corresponding blade mount.

8. The apparatus of claim 6 wherein:
each of the blades lays flat against a corresponding blade mount.

9. The apparatus of claim 6 wherein:
blades secured to blade mounts along the first wall are oriented in a first direction; and
blades secured to blade mounts along the second wall are oriented in a second direction.

10. The apparatus of claim 1 further comprising:
cavities that each communicate with a corresponding orifice, and are dimensioned to receive a nut for securing a fastener in place.

11. The apparatus of claim 1 wherein:
an exterior volume surrounds the scraping tool; and
the scraping tool further comprises a groove that contacts the exterior volume.

12. The apparatus of claim 1 further comprising:
a handle attached to the base member.

13. The apparatus of claim 1 further comprising:
deflectors that protrude upward from the base member and extend from a front end to a back end of the base member to form a debris channel.

14. The apparatus of claim 13 wherein:
the first blade mount and the second blade mount interrupt the deflectors as the deflectors continue along a length of the base member.

15. The apparatus of claim 14 wherein:
the deflectors each comprise a convex arc extending from the base member.

16. The apparatus of claim 14 wherein:
a forward portion of each deflector is semi hemispherical.

17. An apparatus comprising:
a frame defining a C-shaped channel comprising two walls and a base member; and
stationary blades within the C-shaped channel that are secured along and obliquely oriented to the walls of the C-shaped channel such that for each cutting edge of each of the stationary blades, a line coincident with the cutting edge intersects a wall of the frame and the base member of the frame,
wherein the stationary blades positioned along a respective wall have a same orientation, each of the stationary blades is obliquely oriented with respect to a corresponding wall, the stationary blades positioned along different walls extend for less than half of a width of the C-shaped channel, and each of the stationary blades slopes downwards from a corresponding wall towards the base member,
wherein the stationary blades are each removably secured to a blade mount proximate to an orifice in the blade mount that is dimensioned to receive a fastener that secures the stationary blade in place, wherein the orifice defines a central axis oriented oblique to the two walls and the base member; and
wherein the frame comprises the respective blade mounts.

18. The apparatus of claim 17 further comprising: a guide that extends laterally from each of the respective walls, wherein a gap between the guides is located above the stationary blades.

19. The apparatus of claim 18 wherein:
each of the guides includes a curved forward edge.

20. An apparatus comprising:
a frame;
a first set of stationary blades mounted to the frame that are arranged in series along a length of a first side of the frame such that for each cutting edge of each of the stationary blades in the first set, a line coincident with the cutting edge intersects the first side of the frame and a base of the frame; and
a second set of stationary blades mounted to the frame that are arranged in series along the length of a second side of the frame such that for each cutting edge of each of the stationary blades of the second set, a line coincident with the cutting edge intersects the second side of the frame and the base of the frame,
wherein the second side of the frame faces the first side of the frame,
wherein the stationary blades in the first set have the same orientation that is angled towards an interior portion of a channel defined by the frame, and the stationary blades in the second set have an orientation that is mirrored with respect to the stationary blades in the first set, wherein the stationary blades are each removably secured to a respective blade mount proximate to an orifice in the blade mount that is dimensioned to receive a fastener that secures the stationary blade in place, wherein the orifice defines a central axis oriented oblique to one of the first side and the second side of the frame, and to the base of the frame; and wherein the frame comprises the respective blade mounts.

\* \* \* \* \*